United States Patent
Yoshimura

(10) Patent No.: US 8,905,888 B2
(45) Date of Patent: Dec. 9, 2014

(54) TRANSFER MECHANISM FOR FOUR-WHEEL DRIVE VEHICLE

(75) Inventor: Takahiro Yoshimura, Toyota (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 0 days.

(21) Appl. No.: 14/003,178

(22) PCT Filed: Jun. 14, 2011

(86) PCT No.: PCT/JP2011/063568
§ 371 (c)(1),
(2), (4) Date: Sep. 4, 2013

(87) PCT Pub. No.: WO2012/172638
PCT Pub. Date: Dec. 20, 2012

(65) Prior Publication Data
US 2013/0345011 A1    Dec. 26, 2013

(51) Int. Cl.
  *F16H 37/08*  (2006.01)
  *B60K 23/08*  (2006.01)
  *B60K 17/348* (2006.01)

(52) U.S. Cl.
  CPC .............. *B60K 23/08* (2013.01); *B60K 23/0808* (2013.01); *B60K 17/348* (2013.01); *B60K 2023/0816* (2013.01)
  USPC ........................................................ 475/198

(58) Field of Classification Search
  None
  See application file for complete search history.

(56) References Cited

U.S. PATENT DOCUMENTS

| | | |
|---|---|---|
| 4,804,061 A | 2/1989 | Kameda |
| 4,846,016 A | 7/1989 | Takeuchi et al. |
| 6,485,390 B2 | 11/2002 | Inoue |

FOREIGN PATENT DOCUMENTS

| | | |
|---|---|---|
| CA | 2156187 A1 | 6/1995 |
| DE | 694 13 672 T2 | 2/1999 |
| DE | 601 11 975 T2 | 5/2006 |
| EP | 0 684 153 B1 | 11/1995 |
| EP | 1 129 883 B1 | 9/2001 |
| GB | 2 196 070 A | 4/1988 |
| JP | 63-38036 A | 2/1988 |
| JP | 63-151524 A | 6/1988 |
| JP | 63-269729 A | 11/1988 |
| JP | 10-217789 A | 8/1998 |
| JP | 2001-315543 A | 11/2001 |
| WO | 95/16584 A1 | 6/1995 |

*Primary Examiner* — Erin D Bishop
(74) *Attorney, Agent, or Firm* — Sughrue Mion, PLLC

(57) ABSTRACT

A simpler configuration for a power transmission element for realizing gear shift functionality and center differential functionality is achieved in a transfer mechanism (3) for a four-wheel drive vehicle by which rotative power input to an input shaft (11) is transmitted to a rear-wheel output shaft (12) and a front-wheel output shaft (13). The power transmission element includes one planetary gear mechanism (20) configured having a group of gears (21 to 23) that are arranged in a single line in the axial direction and are not moved in the axial direction.

3 Claims, 5 Drawing Sheets

TRANSFER MECHANISM FOR FOUR-WHEEL DRIVE VEHICLE

CROSS REFERENCE TO RELATED APPLICATIONS

This application is a National Stage of International Application No. PCT/JP2011/063568 filed Jun. 14, 2011, the contents of all of which are incorporated herein by reference in their entirety.

TECHNICAL FIELD

The present invention relates to a transfer mechanism for a four-wheel drive vehicle by which rotative power input to an input shaft is transmitted to a front-wheel output shaft and a rear-wheel output shaft.

BACKGROUND ART

For example, PTL 1 discloses a power transmission device for a four-wheel drive vehicle by which rotative power input from a main transmission to an input shaft is transmitted to a front-wheel drive shaft and a rear-wheel drive shaft.

This power transmission device includes a sub transmission and a center differential. The sub transmission and the center differential are each configured by a single-pinion planetary gear mechanism.

With this power transmission device, one of four operation patterns can be selected. The first operation pattern is two-wheel driving in a high-speed gear range (Hi-2WD), the second operation pattern is four-wheel driving in a high-speed gear range in a traveling condition having a differential effect between the front and rear wheels (Hi-4WD-Free), the third operation pattern is four-wheel driving in a high-speed gear range in a traveling condition not having a differential effect between the front and rear wheels (Hi-4WD-Lock), and the fourth operation pattern is four-wheel driving in a low-speed gear range in a traveling condition not having a differential effect between the front and rear wheels (Lo-4WD-Lock). This power transmission device is configured such that the switching of these operation patterns is performed using two switching mechanisms.

For example, in PTL 2, in a transfer mechanism for a four-wheel drive vehicle, a single Ravigneaux planetary gear mechanism is provided with both the functionality of a sub transmission and the functionality of a center differential.

With this transfer mechanism as well, one of four operation patterns (drive modes) that are similar to those of the power transmission device of PTL 1 can be selected. This power transmission device is configured such that the switching of these operation patterns (drive modes) is performed using three clutches and one brake.

CITATION LIST

Patent Literature

[PTL 1] JP S63-269729A
[PTL 2] WO 95/16584

DISCLOSURE OF INVENTION

Technical Problems

In PTL 1, it is pointed out that equipment cost rises since, for example, the power transmission device needs a large number of components due to using a sub transmission and a center differential that are both single pinion planetary gear mechanisms, and it is also pointed out that the axial dimension is large since the sub transmission and the center differential are arranged lined up in series in the axial direction.

Although a single planetary gear mechanism is used in PTL 2, it is pointed out that equipment cost rises and the external dimensions are large since, for example, the configuration is complex and needs a large number of components due to the fact that the planetary gear mechanism is of the Ravigneaux type and is configured such that two sun gears lined up in the axial direction and two pinion gears are arranged and meshed in the radial direction.

In view of such circumstances, an object of the present invention is to achieve a simpler configuration for a power transmission element for realizing gear shift functionality and center differential functionality in a transfer mechanism for a four-wheel drive vehicle by which rotative power input to an input shaft is transmitted to a front-wheel output shaft and a rear-wheel output shaft.

Means for Solving the Problems

A transfer mechanism for a four-wheel drive vehicle according to the present invention includes a power transmission element for realizing gear shift functionality for changing the speed of rotation input to an input shaft and causing the resulting rotation to be output from at least one of a rear-wheel output shaft and a front-wheel output shaft, and center differential functionality for permitting a differential effect between the two output shafts, wherein the power transmission element includes one planetary gear mechanism configured having a group of gears that are arranged in a single line in the axial direction and are not moved in the axial direction, and the power transmission element further includes: a first sleeve for ensuring one of a first coupled state in which the input shaft is coupled with a carrier of the planetary gear mechanism and a second coupled state in which the input shaft is coupled with a sun gear of the planetary gear mechanism; a second sleeve for ensuring one of a first coupled state in which the front-wheel output shaft is coupled with the sun gear, a second coupled state in which the front-wheel output shaft is coupled with the carrier, and a state in which the front-wheel output shaft is disconnected from the sun gear and the carrier and can idle; a third sleeve for ensuring one of a first coupled state in which the rear-wheel output shaft is coupled with a ring gear of the planetary gear mechanism, a second coupled state in which the rear-wheel output shaft is coupled with the carrier, and a third coupled state in which the rear-wheel output shaft is coupled with the ring gear and the carrier; and a frictional engaging element for putting the ring gear into a rotatable free state or a non-rotatable locked state.

In this case, one single pinion planetary gear mechanism is used in the power transmission element for realizing gear shift functionality and center differential functionality, thus achieving a simpler configuration than in the case of using two single pinion planetary gear mechanisms as in PTL 1 and the case of using one Ravigneaux planetary gear mechanism as in PTL 2. As a result, it is possible to reduce the equipment cost and axial dimensions. In this case, it is possible to select a Hi-2WD mode for achieving high-range two-wheel driving, a Hi-4WD-Free mode for achieving high-range four-wheel driving in a state in which the differential effect is permitted, a Hi-4WD-Lock mode for achieving high-range four-wheel driving in a state in which the differential effect is prohibited, and a Lo-4WD-Lock mode for achieving low-range four-wheel driving in a state in which the differential effect is prohibited.

In the Hi-2WD mode, it is sufficient that the ring gear is put in the rotatable free state using the frictional engaging element, the first sleeve is used to achieve the first coupled state in which the input shaft and the carrier are coupled, the second sleeve is used to disconnect the front-wheel output shaft from the sun gear and the carrier so as to achieve a state in which the front-wheel output shaft can idle, and the third sleeve is used to achieve the third coupled state in which the rear-wheel output shaft is coupled with the ring gear and the carrier.

In the Hi-4WD-Free mode, it is sufficient that the ring gear is put in the rotatable free state using the frictional engaging element, the first sleeve is used to achieve the first coupled state in which the input shaft and the carrier are coupled, the second sleeve is used to achieve the first coupled state in which the front-wheel output shaft and the sun gear are coupled, and the third sleeve is used to achieve the first coupled state in which 5 the rear-wheel output shaft and the ring gear are coupled.

In the Hi-4WD-Lock mode, it is sufficient that the ring gear is put in the rotatable free state using the frictional engaging element, the first sleeve is used to achieve the first coupled state in which the input shaft and the 10 carrier are coupled, the second sleeve is used to achieve the first coupled state in which the front-wheel output shaft and the sun gear are coupled, and the third sleeve is used to achieve the third coupled state in which the rear-wheel output shaft is coupled with the ring gear and the carrier.

In the Lo-4WD-Lock mode, the ring gear is put in the non-rotatable 15 locked state using the frictional engaging element, the first sleeve is used to achieve the second coupled state in which the input shaft and the sun gear are coupled, the second sleeve is used to achieve the second coupled state in which the front-wheel output shaft and the carrier are coupled, and the third sleeve is used to achieve the second coupled state in which the rear-wheel output shaft and the carrier are coupled.

Preferably, a configuration is possible in which the power transmission element further includes a range switching element for switching the gear ratio to a low range or a high range.

In this case, it is possible to switch the gear ratio between two levels, namely the low range and the high range.

Preferably, the range switching element includes a low gear piece, a high gear piece, an internally-toothed gear provided on an inner edge of the input shaft, and a first sleeve, the low gear piece is an externally-toothed gear provided on an outer diameter side of a tip of a central tube shaft part provided so as to extend toward one side in the axial direction in the center of a sun gear of the planetary gear mechanism, the high gear piece is an externally-toothed gear provided on an outer diameter side of a portion of a central shaft part that protrudes from an opening at the tip of the central tube shaft part, the central shaft part being provided so as to be inserted in the center of a carrier of the planetary gear mechanism so as to be capable of relative rotation on an inner diameter side of the central tube shaft part, and the high gear piece being arranged in a line with the low gear piece in the axial direction without being in contact therewith, and the outer circumference of the first sleeve has external teeth that are capable of meshing with an internally-toothed gear of the input shaft, the inner circumference of the first sleeve has internal teeth that are capable of meshing with external teeth of the low gear piece or external teeth of the high gear piece, and when the low range is requested, the first sleeve is caused to slide to a position of meshing with the internally-toothed gear of the input shaft and the external teeth of the low gear piece, whereas when the high range is requested, the first sleeve is caused to slide a position of meshing with the internally-toothed gear of the input shaft and the external teeth of the high gear piece.

In this case, by causing the first sleeve to slide to one side in the axial direction, it is possible to ensure a low range power transmission route with the planetary gear mechanism when the input shaft and the low gear piece are coupled, and it is possible to ensure a high range power transmission route with the planetary gear mechanism when the input shaft and the high gear piece are coupled.

Preferably, a configuration is possible in which the power transmission element further includes a mode switching element for switching to either a four-wheel drive mode in which rotative power input to the input shaft is output from the rear-wheel output shaft and the front-wheel output shaft, or a two-wheel drive mode in which rotative power input to the input shaft is output from the rear-wheel output shaft or the front-wheel output shaft.

In this case, not only a four-wheel drive mode, but also a two-wheel drive mode can be selected by the mode switching element.

Preferably, a configuration is possible in which the power transmission element further includes a differential switching element for switching to a state in which the differential effect between the two output shafts is permitted and a state in which the differential effect is prohibited.

In this case, in the four-wheel drive mode, it is possible to switch to a state in which the differential effect between the two output shafts is permitted and a state in which it is prohibited.

Preferably, a configuration is possible in which the power transmission element further includes: a first sleeve for ensuring one of a first coupled state in which the input shaft is coupled with a carrier of the planetary gear mechanism and a second coupled state in which the input shaft is coupled with a sun gear of the planetary gear mechanism; a second sleeve for ensuring one of a first coupled state in which the front-wheel output shaft is coupled with the sun gear, a second coupled state in which the front-wheel output shaft is coupled with the carrier, and a state in which the front-wheel output shaft is disconnected from the sun gear and the carrier and can idle; a third sleeve for ensuring one of a first coupled state in which the rear-wheel output shaft is coupled with a ring gear of the planetary gear mechanism, a second coupled state in which the rear-wheel output shaft is coupled with the carrier, and a third coupled state in which the rear-wheel output shaft is coupled with the ring gear and the carrier; and a frictional engaging element for putting the ring gear into a rotatable free state or a non-rotatable locked state.

Preferably, a configuration is possible in which the planetary gear mechanism includes: a ring gear arranged so as to be capable of rotation; a sun gear arranged concentrically on an inner diameter side of the ring gear with a predetermined space therebetween; a plurality of pinion gears that are interposed between the ring gear and the sun gear so as to mesh therewith; a carrier that rotatably supports the pinion gears and is arranged so as to be capable of rotating in synchronization with revolving motion of the pinion gears; and a frictional engaging element for putting the ring gear into a rotatable free state or a non-rotatable locked state.

Here, the configuration of the planetary gear mechanism is specified. In this case, by putting the ring gear into the rotatable free state using the frictional engaging element, the sun gear, pinion gears, carrier, and ring gear of the planetary gear mechanism are all capable of relative rotation. By putting the ring gear in the non-rotatable locked state using the frictional engaging element, the sun gear, pinion gears, and carrier of the planetary gear mechanism are capable of relative rotation.

Effects of the Invention

According to the present invention, it is possible to achieve a simpler configuration for a power transmission element for realizing gear shift functionality and center differential functionality in a transfer mechanism for a four-wheel drive vehicle by which rotative power input to an input shaft is transmitted to a front-wheel output shaft and a rear-wheel output shaft. This enables contributing to a reduction in the equipment cost and external dimensions of a transfer mechanism.

MODE FOR CARRYING OUT THE INVENTION

Below is a detailed description of a preferred embodiment for carrying out the present invention with reference to the accompanying drawings.

FIGS. 1 to 5 show an embodiment of the present invention. First, the overall configuration of an embodiment of a drive device for a four-wheel drive vehicle in which a transfer mechanism according to the present invention is used will be described with reference to FIG. 1. One example of the drive device for a four-wheel drive vehicle illustrated as an example in this embodiment is a drive device for a four-wheel drive vehicle whose basic configuration is that of a drive device for a front-engine, rear-wheel-drive (FR) vehicle.

Figure 1:
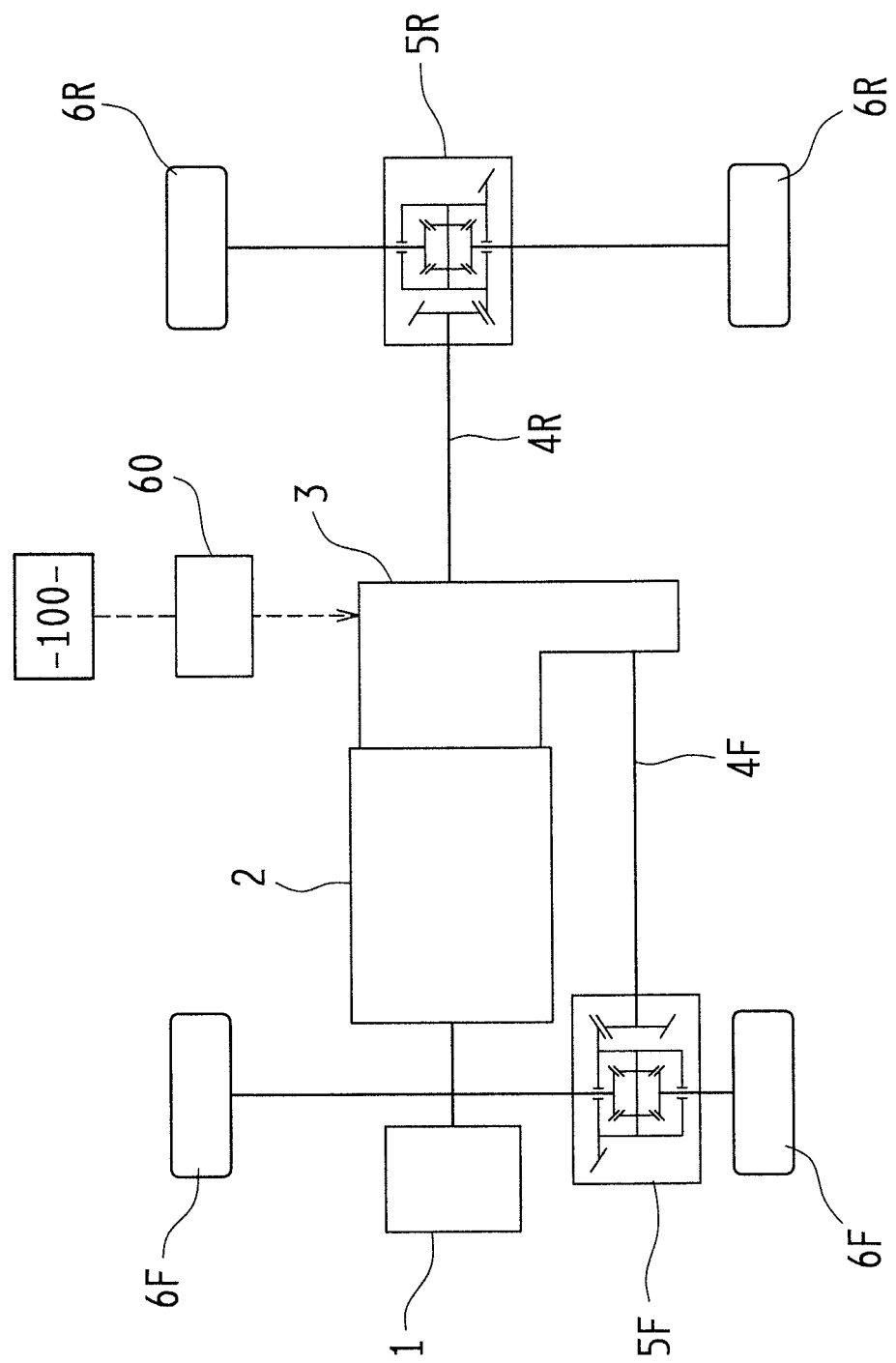
FIG. 1 is a diagram showing a schematic configuration of a drive device for a four-wheel drive vehicle in which a transfer mechanism for a four-wheel drive vehicle according to the present invention is used.

The drive device for a four-wheel drive vehicle shown in FIG. 1 includes an engine 1, a transmission 2, a transfer mechanism 3, a front propeller shaft 4F, a rear propeller shaft 4R, a front differential 5F, and a rear differential 5R. Note that reference signs 6F and 6R in FIG. 1 respectively denote front wheels and rear wheels. In the following description of these elements, illustration and description has been simplified for portions that are not directly related to features of the present invention.

The engine 1 is a well-known drive source such as a gasoline engine or diesel engine that outputs rotative power by burning fuel.

The transmission 2 changes the speed of rotation of an output shaft (crankshaft) (not shown) of the engine 1 and outputs the resulting rotation. This transmission 2 is called a main transmission mechanism or the like, and is configured using, for example, a planetary gear mechanism or a large number of gear trains and a synchronization mechanism.

As shown in FIGS. 2 to 5, the transfer mechanism 3 includes an input shaft 11, a rear-wheel output shaft 12, a front-wheel output shaft 13, a single planetary gear mechanism 20, a range switching element 30, a mode switching element 40, a differential switching element 50, and the like.

The input shaft 11 is rotatably supported to a transfer case 14 via a rolling bearing (not shown). Rotative power output from the transmission 2 is input to input shaft 11.

The rear-wheel output shaft 12 is arranged so as to be coaxial with the input shaft 11. This rear-wheel output shaft 12 outputs rotative power to the left and right rear wheels 6R via the rear propeller shaft 4R, the rear differential 5R, and left and right rear drive shafts (not denoted by reference signs).

The front-wheel output shaft 13 is arranged so as to be parallel with the rear-wheel output shaft 12. This front-wheel output shaft 13 is provided with a power transmission unit (15 to 17). This power transmission unit is configured including, for example, a drive gear 15, a driven gear 16, and a loop-shaped member 17 constituted by a drive chain or a drive belt.

Specifically, the drive gear 15 is attached so as to be capable of relative rotation via an appropriate rolling bearing (not shown) on the outer diameter side of a central tube shaft part 22a of a sun gear 22 of the later-described planetary gear mechanism 20. The driven gear 16 is provided on the outer diameter side of the front-wheel output shaft 13 so as to rotate integrally therewith. The loop-shaped member 17 is wrapped around the drive gear 15 and the driven gear 16.

In this way, the front-wheel output shaft 13 outputs rotative power to the left and right front wheels 6F via the power transmission unit (15 to 17), the front propeller shaft 4F, the front differential 5F, and left and right front drive shafts (not denoted by reference signs).

It should be noted that the single planetary gear mechanism 20, the range switching element 30, the mode switching element 40, the differential switching element 50, and the like correspond to the power transmission unit recited in the claims.

This power transmission element is provided in order to realize gear shift functionality for changing the speed of rotative power input to the input shaft 11 by an appropriate gear ratio and outputting the resulting rotative power to at least either the rear-wheel output shaft 12 or the front-wheel output shaft 13, and center differential functionality for permitting a differential effect between the rear-wheel output shaft 12 and the front-wheel output shaft 13.

Figure 2:
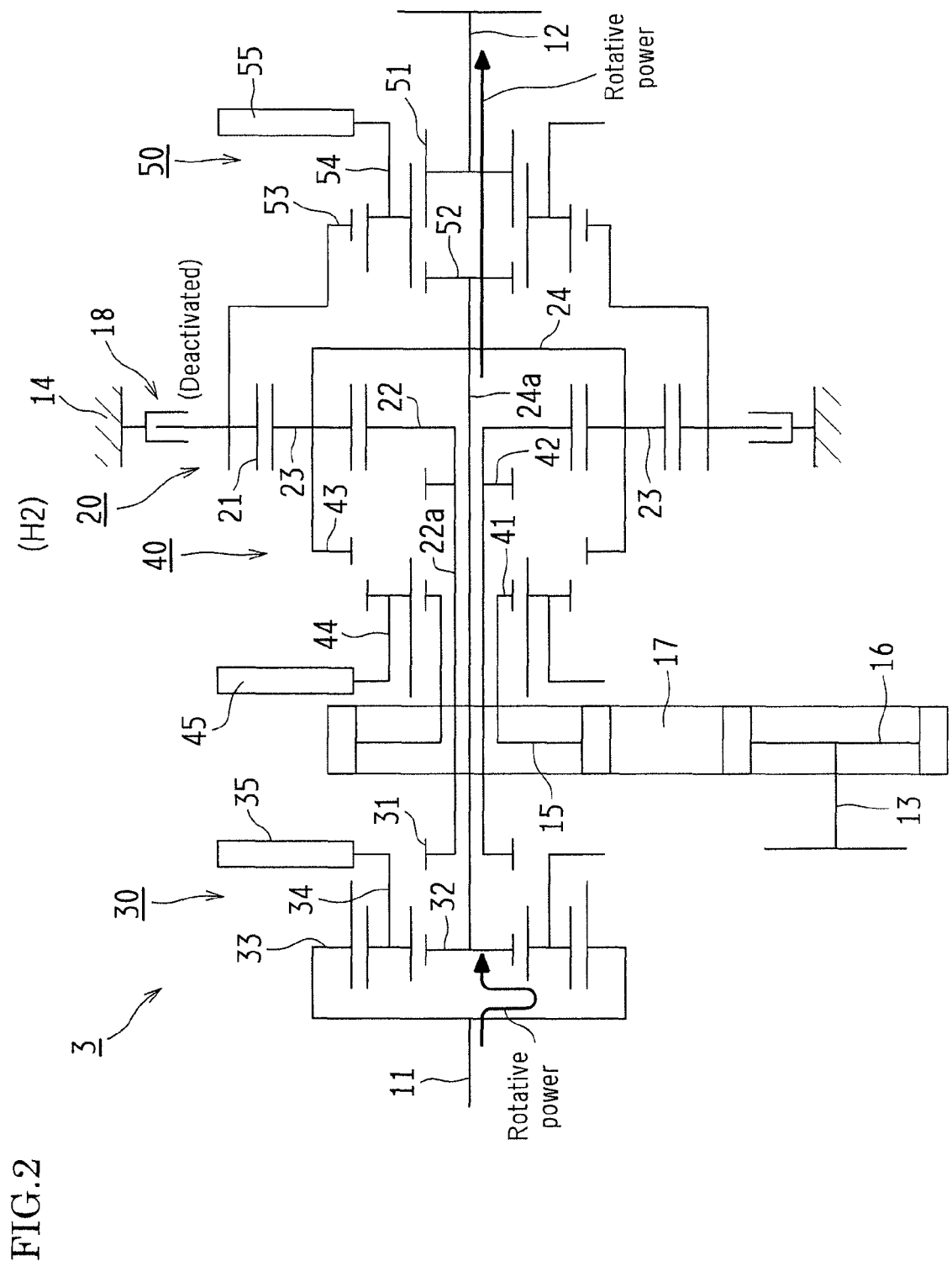
FIG. 2 is a schematic diagram showing an overview of a configuration of the transfer mechanism in FIG. 1, and shows a Hi-2WD mode.
Figure 3:
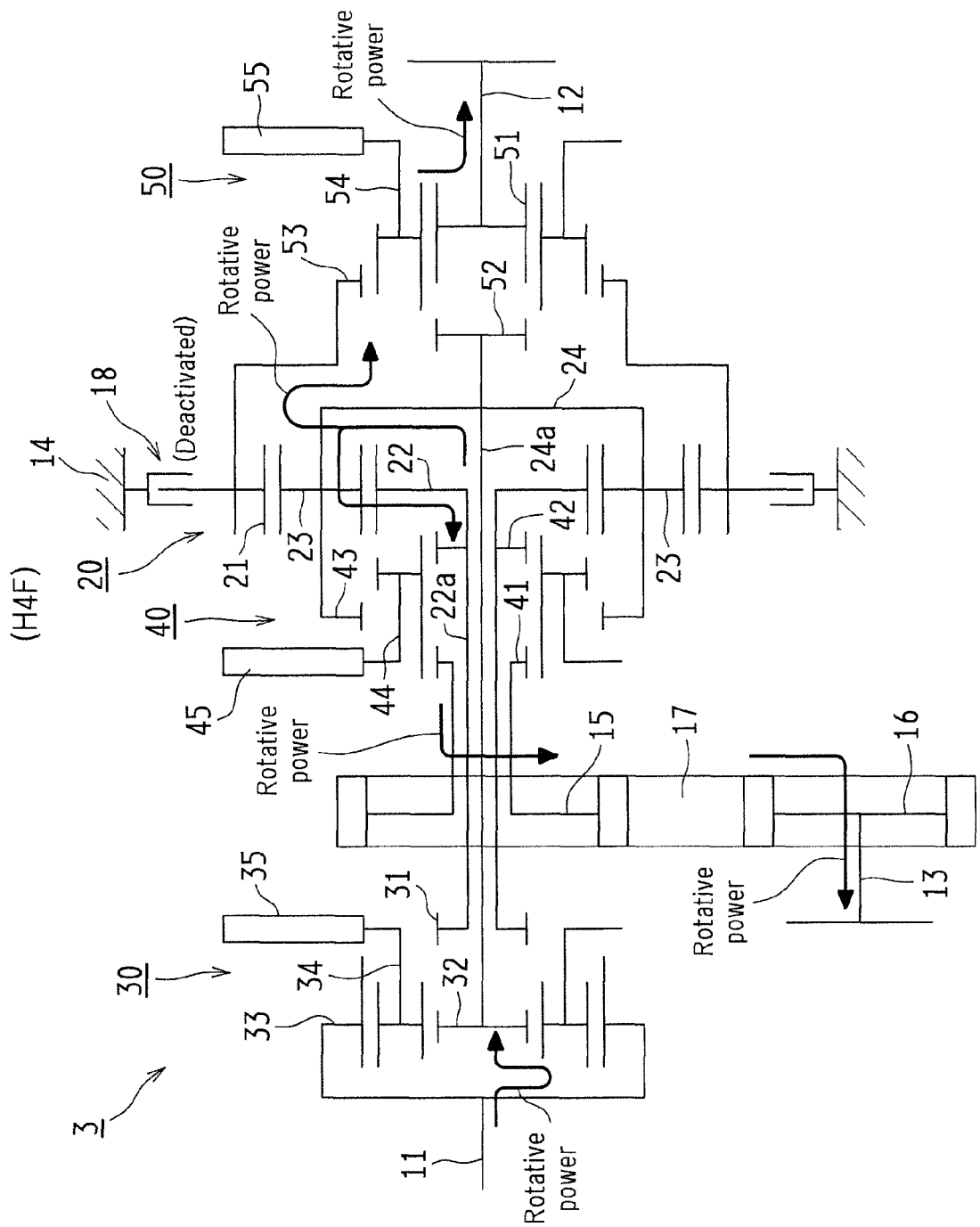
FIG. 3 is a schematic diagram showing an overview of the configuration of the transfer mechanism in FIG. 1, and shows a Hi-4WD-Free mode.
Figure 4:
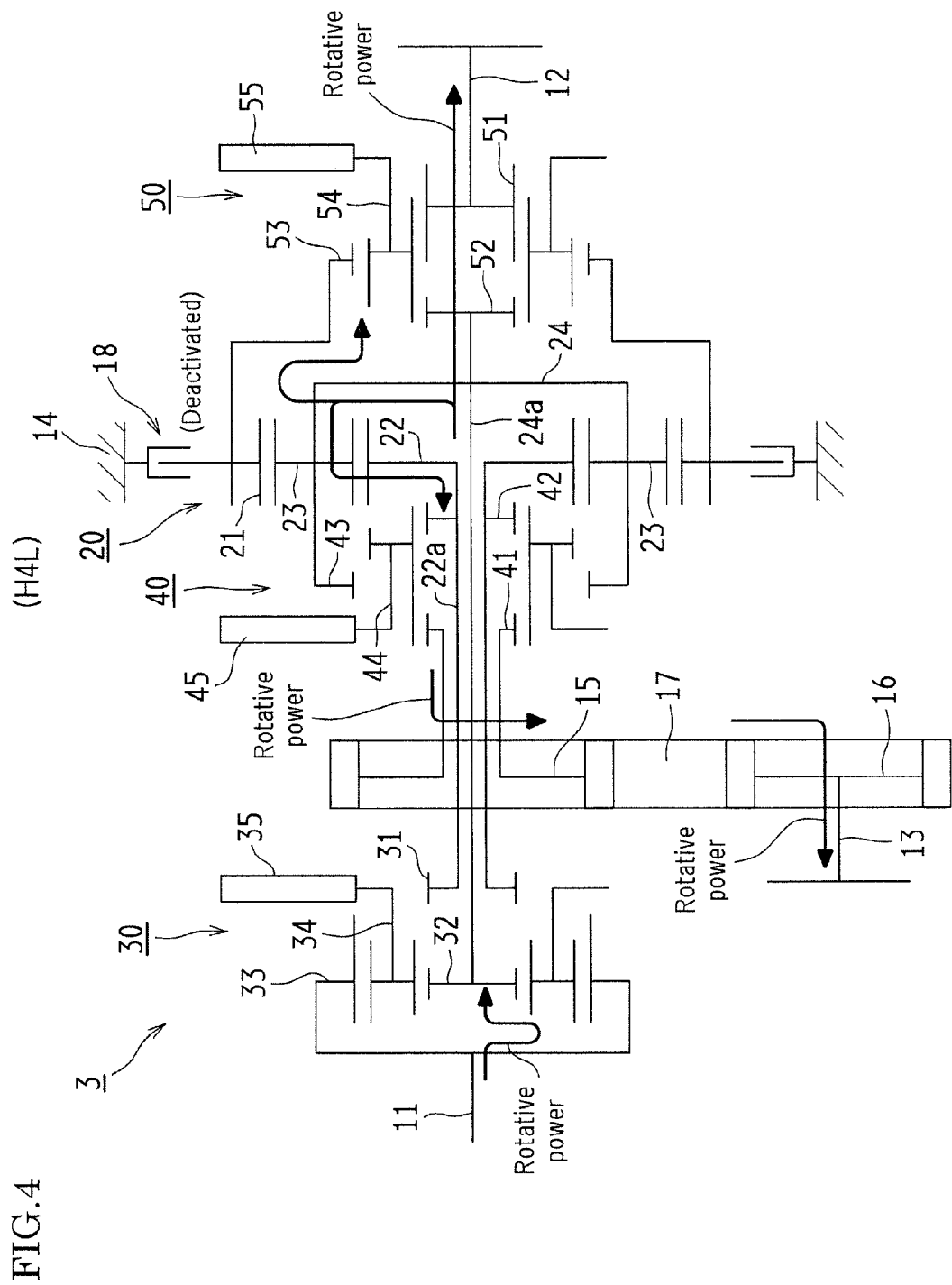
FIG. 4 is a schematic diagram showing an overview of the configuration of the transfer mechanism in FIG. 1, and shows a 5 Hi-4WD Lock mode.

As shown in FIGS. 2 to 4, the planetary gear mechanism 20 is configured having a group of gears that are arranged in a single line in the axial direction and are not moved in the axial direction, that is to say, the planetary gear mechanism 20 is of the single pinion type. Specifically, the planetary gear mechanism 20 includes, for example, a ring gear 21 constituted by an internally-toothed gear, the sun gear 22 constituted by an externally-toothed gear, multiple pinion gears 23 constituted by externally-toothed gears, and a carrier 24. These gears are arranged so as to be incapable of moving in the axial direction.

The ring gear 21 is supported to the transfer case 14 via a brake 18. The sun gear 22 is arranged on the inner diameter side of the ring gear 21 with a gap therebetween. The pinion gears 23 are arranged so as to be meshed with the ring gear 21 and the sun gear 22 in the annular space therebetween. The carrier 24 rotatably supports the pinion gears 23 and rotates in synchronization with the revolving motion of the pinion gears 23.

Note that although not shown in detail, the brake 18 is, for example, a well-known multi-disc frictional engaging element, and includes an inner diameter side friction plate provided on the ring gear 21 side and an outer diameter side friction plate provided on the transfer case 14 side.

Regarding the movement of the brake 18, when subjected to, for example, hydraulic pressure or electromagnetic force from an actuation source (not shown), the inner diameter side friction plate and the outer diameter side friction plate become frictionally engaged, thus putting the ring gear 21 into a non-rotatable locked state by integrating it with the transfer case 14, and when the hydraulic pressure or electromagnetic force disappears, the inner diameter side friction plate and the outer diameter side friction plate are released and separated so as to put the ring gear 21 into a rotatable free state by separating it from the transfer case 14.

The range switching element 30 enables switching the gear ratio achieved by the planetary gear mechanism 20 to a low range (L) or a high range (H).

Specifically, as shown in FIGS. 2 to 5, the range switching element 30 is configured including a low gear piece 31, a high gear piece 32, an internally-toothed gear 33 of the input shaft 11, a first sleeve 34, and the like.

The low gear piece 31 is provided on the outer diameter side of the tip of the central tube shaft part 22a, which is provided so as to extend toward one side in the axial direction in the center of the sun gear 22 of the planetary gear mechanism 20.

The high gear piece 32 is provided on the outer diameter side of a portion of a central shaft part 24a that protrudes from the opening at the tip of the central tube shaft part 22a, the central shaft part 24a being provided so as to be inserted in the center of the carrier 24 of the planetary gear mechanism 20 so as to be capable of relative rotation on the inner diameter side of the central tube shaft part 22a.

The low gear piece 31 and the high gear piece 32 are both an externally-toothed gear, and the low gear piece 31 and the high gear piece 32 are arranged in a line so as to be adjacent to each other in the axial direction without being in contact with each other.

The internally-toothed gear 33 is provided on the inner edge of the input shaft 11. The first sleeve 34 is arranged so as to be capable of sliding in the axial direction between the internally-toothed gear 33 of the input shaft 11 and the low gear piece 31 and high gear piece 32. The outer circumference of the first sleeve 34 has external teeth that are capable of meshing with the internally-toothed gear 33 of the input shaft 11, and the inner circumference of the first sleeve 34 has internal teeth that are capable of meshing with the external teeth of the low gear piece 31 or the external teeth of the high gear piece 32. Note that these teeth are also called splines.

First, when the first sleeve 34 is caused to slide to a position of being meshed with the internally-toothed gear 33 of the input shaft 11 and the external teeth of the high gear piece 32, the input shaft 11 and the carrier 24 of the planetary gear mechanism 20 are put into a first coupled state of being coupled via the first sleeve 34, the high gear piece 32, and the central shaft part 24a. On the other hand, when the first sleeve 34 is caused to slide to a position of being meshed with the internally-toothed gear 33 of the input shaft 11 and the external teeth of the low gear piece 31, the input shaft 11 and the sun gear 22 of the planetary gear mechanism 20 are put into a second coupled state of being coupled via the first sleeve 34, the low gear piece 31, and the central tube shaft part 22a.

The mode switching element 40 enables switching to a four-wheel drive (4WD) mode or a two-wheel drive (2WD) mode.

Note that the four-wheel drive mode is a mode that ensures a power transmission route according to which the rotative power input to the input shaft 11 is output from both the rear-wheel output shaft 12 and the front-wheel output shaft 13. The two-wheel drive mode is a mode that ensures a power transmission route according to which the rotative power input to the input shaft 11 is output from only the rear-wheel output shaft 12.

Specifically, as shown in FIGS. 2 to 5, the mode switching element 40 is configured including an externally-toothed gear 41 of the drive gear 15, an externally-toothed gear 42 of the sun gear 22, an internally-toothed gear 43 of the carrier 24, a second sleeve 44, and the like.

The externally-toothed gear 41 of the drive gear 15 is provided on the outer diameter side of the tip of the central shaft part of the drive gear 15. The externally-toothed gear 42 of the sun gear 22 is provided on the outer diameter side of the central tube shaft part 22a of the sun gear 22 at a midpoint in the axial direction. The internally-toothed gear 43 of the carrier 24 is provided on the inner diameter side of the tip of the pinion shaft inserted in the pinion gear 23 in the carrier 24.

The second sleeve 44 is arranged so as to be capable of sliding in the axial direction between the externally-toothed gear 41 of the drive gear 15 and the externally-toothed gear 42 of the sun gear 22 and internally-toothed gear 43 of the carrier 24. The outer circumference of the second sleeve 44 has external teeth that are capable of meshing with the internal teeth of the internally-toothed gear 43 of the carrier 24, and the inner circumference of the second sleeve 44 has internal teeth that are capable of meshing with the external teeth of the externally-toothed gear 41 of the front-wheel output shaft 13 and the external teeth of the externally-toothed gear 42 of the sun gear 22. Note that these teeth are also called splines.

In order to achieve the two-wheel drive mode, it is sufficient for the second sleeve 44 to be caused to slide to a position of meshing with only the externally-toothed gear 41 of the drive gear 15 and not meshing with the externally-toothed gear 42 of the sun gear 22 or the internally-toothed gear 43 of the carrier 24, thus achieving a state in which the drive gear 15 can idle.

Also, in order to achieve the four-wheel drive mode, it is sufficient for the second sleeve 44 to be caused to slide to a position of meshing with the externally-toothed gear 41 of the drive gear 15 and the externally-toothed gear 42 of the sun gear 22 so as to achieve the first coupled state in which the sun gear 22 and the front-wheel output shaft 13 are coupled, or for the second sleeve 44 to be caused to slide to a position of being meshed with the externally-toothed gear 41 of the drive gear 15 and the internally-toothed gear 43 of the carrier 24 so as to achieve the second coupled state in which the carrier 24 and the front-wheel output shaft 13 are coupled.

In the four-wheel drive mode, the differential switching element 50 enables achieving a state in which the differential effect between the rear-wheel output shaft 12 and the front-wheel output shaft 13 is permitted or a state in which the differential effect is prohibited.

Specifically, as shown in FIGS. 2 to 5, the differential switching element 50 is configured including an externally-toothed gear 51 of the rear-wheel output shaft 12, an externally-toothed gear 52 of the carrier 24, an internally-toothed gear 53 of the ring gear 21, a third sleeve 54, and the like.

The externally-toothed gear 51 of the rear-wheel output shaft 12 is provided on the outer diameter side of the tip of the central shaft part of the rear-wheel output shaft 12. The externally-toothed gear 52 of the carrier 24 is provided on the end part of the central shaft part 24a of the carrier 24, specifically the end part on the rear-wheel output shaft 12 side. The internally-toothed gear 53 of the ring gear 21 is provided on the inner diameter side of the tip of a tube shaft 21a provided so as to protrude from the ring gear 21 toward the rear-wheel output shaft 12.

The third sleeve 54 is arranged so as to be capable of sliding in the axial direction between the internally-toothed gear 53 of the ring gear 21 and the externally-toothed gear 51 of the rear-wheel output shaft 12 and externally-toothed gear 52 of the carrier 24. The outer circumference of the third sleeve 54 has external teeth that are capable of meshing with the internally-toothed gear 53 of the ring gear 21, and the inner circumference of the third sleeve 54 has internal teeth that are capable of meshing with the externally-toothed gear 51 of the rear-wheel output shaft 12 and the externally-toothed gear 52 of the carrier 24. Note that these teeth are also called splines.

In the case of deactivating the brake 18 so as to put the ring gear 21 into the rotatable free state, the third sleeve 54 is meshed with the externally-toothed gear 51 of the rear-wheel output shaft 12 and the internally-toothed gear 53 of the ring gear 21 such that the third sleeve 54 achieves the first coupled state in which the rear-wheel output shaft 12 and the ring gear 21 are coupled, thus achieving a state in which the carrier 24, the ring gear 21, and the sun gear 22 of the planetary gear mechanism 20 are capable of relative rotation. In this state, the differential effect between the rear-wheel output shaft 12 and the front-wheel output shaft 13 is permitted.

Also, in the case of deactivating the brake 18 so as to put the ring gear 21 into the rotatable free state, the third sleeve 54 is meshed with the externally-toothed gear 51 of the rear-wheel output shaft 12, the internally-toothed gear 53 of the ring gear 21, and the externally-toothed gear 52 of the carrier 24 such that the third sleeve 54 achieves a third coupled state in which the rear-wheel output shaft 12, the ring gear 21, and the carrier 24 are coupled, thus achieving a state in which the carrier 24, the ring gear 21, and the sun gear 22 of the planetary gear mechanism 20 are not capable of relative rotation, and therefore the differential effect between the rear-wheel output shaft 12 and the front-wheel output shaft 13 is prohibited.

Furthermore, in the case of actuating the brake 18 so as to put the ring gear 21 into the non-rotatable locked state, the third sleeve 54 is caused to slide to a position of being meshed with the externally-toothed gear 51 of the rear-wheel output shaft 12 and the externally-toothed gear 52 of the carrier 24 such that the third sleeve 54 achieves the second coupled state in which the rear-wheel output shaft 12 and the carrier 24 are coupled, thus achieving a state in which the carrier 24, the ring gear 21, and the sun gear 22 of the planetary gear mechanism 20 are not capable of relative rotation, and therefore the differential effect between the rear-wheel output shaft 12 and the front-wheel output shaft 13 is prohibited.

Incidentally, a first shift fork 35 is locked to the first sleeve 34 of the range switching element 30, a second shift fork 45 is locked to the second sleeve 44 of the mode switching element 40, and a third shift fork 55 is locked to the third sleeve 54 of the differential switching element 50.

The first to third shift forks 35, 45, and 55 are individually actuated by a shift actuator 60 (see FIG. 1). Specifically, the range switching element 30, the mode switching element 40, and the differential switching element 50 are actuated by using the first to third shift forks 35, 45, and 55 to individually cause the first to third sleeves 34, 44, and 54 to slide parallel to the central axis line.

Although not shown in detail, rotative power generated by a shift motor is decelerated by the power transmission mechanism and transmitted by the shift actuator 60 to the first to third shift forks 35, 45, and 55 as thrust in the axial direction, and thus the shift actuator 60 causes the first to third shift forks 35, 45, and 55 to individually slide parallel to the central axis line.

This operation of the shift actuator 60 is controlled by a 4WD control computer 100 (see FIG. 1). The 4WD control computer 100 has a well-known configuration including a CPU (central processing unit), a ROM (program memory), a RAM (data memory), a backup RAM (non-volatile memory), and the like (not shown).

The ROM stores, for example, various types of control programs and maps referenced when the various types of control programs are executed. The CPU executes arithmetic processing based on the various types of control programs and maps stored in the ROM. The RAM is a memory that temporarily stores, for example, the results of arithmetic processing executed by the CPU and data input from various sensors, and the backup RAM is a non-volatile memory that stores, for example, data that is to be saved when the engine 1 is stopped.

Next, with the drive device for a four-wheel drive vehicle including the transfer mechanism 3 having the above-described configuration, one of the following four drive modes can be selected.

The following is a detailed description of these four drive modes with reference to FIGS. 2 to 5. The switching of these four drive modes is performed by, for example, a driver operating an appropriate switching switch (not shown) disposed in the vicinity of the driver seat.

Specifically, when an output signal from the switching switch is input to the 4WD control computer 100, the 4WD control computer 100 recognizes the 20 requested drive mode, and achieves one of the first to fourth drive modes shown in FIGS. 2 to 5 by, based on the recognition result, controlling the brake 18 and using the shift actuator 60 to cause the first sleeve 34 of the range switching element 30, the second sleeve 44 of the mode switching element 40, and the third sleeve 54 of the differential switching element 50 to 25 slide individually. The first to fourth drive modes will be described below.

(1) The first drive mode is a combination for achieving high-range (high-speed gear range) rear-wheel two-wheel driving, and is called the "Hi-2WD" mode, which is abbreviated to the "H2" mode.

When the "H2" mode is selected, the state shown in FIG. 2 is achieved. Specifically, by first deactivating the brake 18 so as to put the ring gear 21 into the rotatable free state, and causing the first sleeve 34 of the range switching element 30 to slide to a position of being meshed with the internally-toothed gear 33 of the input shaft 11 and the external teeth of the high gear piece 32, the first sleeve 34 achieves the first coupled state in which the input shaft 11 is coupled with the high gear piece 32 and the carrier 24. Also, by causing the second sleeve 44 of the mode switching element 40 to mesh with only the externally-toothed gear 41 of the drive gear 15, a state in which the drive gear 15 can idle is achieved. Furthermore, by causing the third sleeve 54 of the differential switching element 50 to slide to a position of being meshed with the externally-toothed gear 51 of the rear-wheel output shaft 12, the externally-toothed gear 52 of the carrier 24, and the internally-toothed gear 53 of the ring gear 21, the third sleeve 54 achieves the third coupled state in which the rear-wheel output shaft 12 is coupled with the carrier 24 and the ring gear 21.

In this case, as shown by the bold arrow in FIG. 2, rotative power input from the input shaft 11 to the first sleeve 34 and the high gear piece 32 is input to the carrier 24 of the planetary gear mechanism 20 via the central shaft part 24a, and is directly transmitted from the externally-toothed gear 52 of the carrier 24 to the rear-wheel output shaft 12 via the third sleeve 54.

(2) The second drive mode is a combination for achieving high-range (high-speed gear range) four-wheel driving and a state in which the differential effect between the front-wheel output shaft 13 and the rear-wheel output shaft 12 is permitted, and is called the "Hi-4WD-Free" mode, which is abbreviated to the "H4F" mode.

When the "H4F" mode is selected, the state shown in FIG. 3 is achieved. Specifically, by first deactivating the brake 18 so as to put the ring gear 21 into the rotatable free state, and causing the first sleeve 34 of the range switching element 30 to slide to a position of being meshed with the internally-toothed gear 33 of the input shaft 11 and the external teeth of the high gear piece 32, the first sleeve 34 achieves the first coupled state in which the input shaft 11 is coupled with the high gear piece 32 and carrier 24. Also, by causing the second sleeve 44 of the mode switching element 40 to slide to a position of being meshed with the externally-toothed gear 41 of the drive gear 15 and the externally-toothed gear 42 of the sun gear 22, the second sleeve 44 achieves the first coupled state in which the drive gear 15 and the sun gear 22 are coupled. Furthermore, by causing the third sleeve 54 of the differential switching element 50 to slide to a position of being meshed with the externally-toothed gear 51 of the rear-wheel output shaft 12 and the internally-toothed gear 53 of the ring gear 21, the third sleeve 54 achieves the first coupled state in which the rear-wheel output shaft 12 and the ring gear 21 are coupled. Accordingly, a state in which the carrier 24, the ring gear 21, and the sun gear 22 of the planetary gear mechanism 20 are capable of relative rotation is achieved.

In this case, as shown by the bold arrow in FIG. 3, rotative power input from the input shaft 11 to the first sleeve 34 and the high gear piece 32 is input to the carrier 24 of the planetary gear mechanism 20 via the central shaft part 24a, is transmitted from the pinion gears 23 supported by the carrier 24 to the rear-wheel output shaft 12 via the ring gear 21 and the third sleeve 54, and is transmitted from the pinion gears 23 supported by the carrier 24 to the front-wheel output shaft 13 via the sun gear 22, the second sleeve 44, and the power transmission unit (15 to 17). In this state, the pinion gears 23 supported by the carrier 24, the ring gear 21, and the sun gear 22 of the planetary gear mechanism 20 are capable of relative rotation, and therefore the above-described rotative power is differentially distributed to the rear-wheel output shaft 12 and the front-wheel output shaft 13.

(3) The third drive mode is a combination for achieving high-range (high-speed gear range) four-wheel driving and a state in which the differential effect between the front-wheel output shaft 13 and the rear-wheel output shaft 12 is prohibited (center differential locked state), and is called the "Hi-4WD-Lock" mode, which is abbreviated to the "H4L" mode.

When the "H4L" mode is selected, the state shown in FIG. 4 is achieved. Specifically, by first deactivating the brake 18 so as to put the ring gear 21 into the rotatable free state, and causing the first sleeve 34 of the range switching element 30 to slide to a position of being meshed with the internally-toothed gear 33 of the input shaft 11 and the external teeth of the high gear piece 32, the first sleeve 34 achieves the first coupled state in which the input shaft 11 is coupled with the high gear piece 32 and the carrier 24. Also, by causing the second sleeve 44 of the mode switching element 40 to slide to a position of being meshed with the externally-toothed gear 41 of the drive gear 15 and the externally-toothed gear 42 of the sun gear 22, the second sleeve 44 achieves the first coupled state in which the drive gear 15 and the sun gear 22 are coupled. Furthermore, by causing the third sleeve 54 of the differential switching element 50 to slide to a position of being meshed with the externally-toothed gear 51 of the rear-wheel output shaft 12, the externally-toothed gear 52 of the carrier 24, and the internally-toothed gear 53 of the ring gear 21, the third sleeve 54 achieves the third coupled state in which the rear-wheel output shaft 12 is coupled with the carrier 24 and the ring gear 21. Accordingly, a state in which the pinion gears 23 supported by the carrier 24, the ring gear 21, and the sun gear 22 of the planetary gear mechanism 20 are not capable of relative rotation is achieved.

In this case, as shown by the bold arrow in FIG. 4, rotative power input from the input shaft 11 to the first sleeve 34 and the high gear piece 32 is input to the carrier 24 of the planetary gear mechanism 20 via the central shaft part 24a, is directly transmitted from the externally-toothed gear 52 of the carrier 24 to the rear-wheel output shaft 12 via the third sleeve 54, and is transmitted from the pinion gears 23 supported by the carrier 24 to the front-wheel output shaft 13 via the sun gear 22, the second sleeve 44, and the power transmission unit (15 to 17). In this state, the pinion gears 23 supported by the carrier 24, the ring gear 21, and the sun gear 22 of the planetary gear mechanism 20 are not capable of relative rotation, and therefore the above-described rotative power is no longer differentially distributed to the rear-wheel output shaft 12 and the front-wheel output shaft 13.

(4) The fourth drive mode is a combination for achieving low-range (low-speed gear range) four-wheel driving and a state in which the differential effect between the front-wheel output shaft 13 and the rear-wheel output shaft 12 is prohibited (center differential locked state), and is called the "Lo-4WD-Lock" mode, which is abbreviated to the "L4L" mode.

Figure 5:
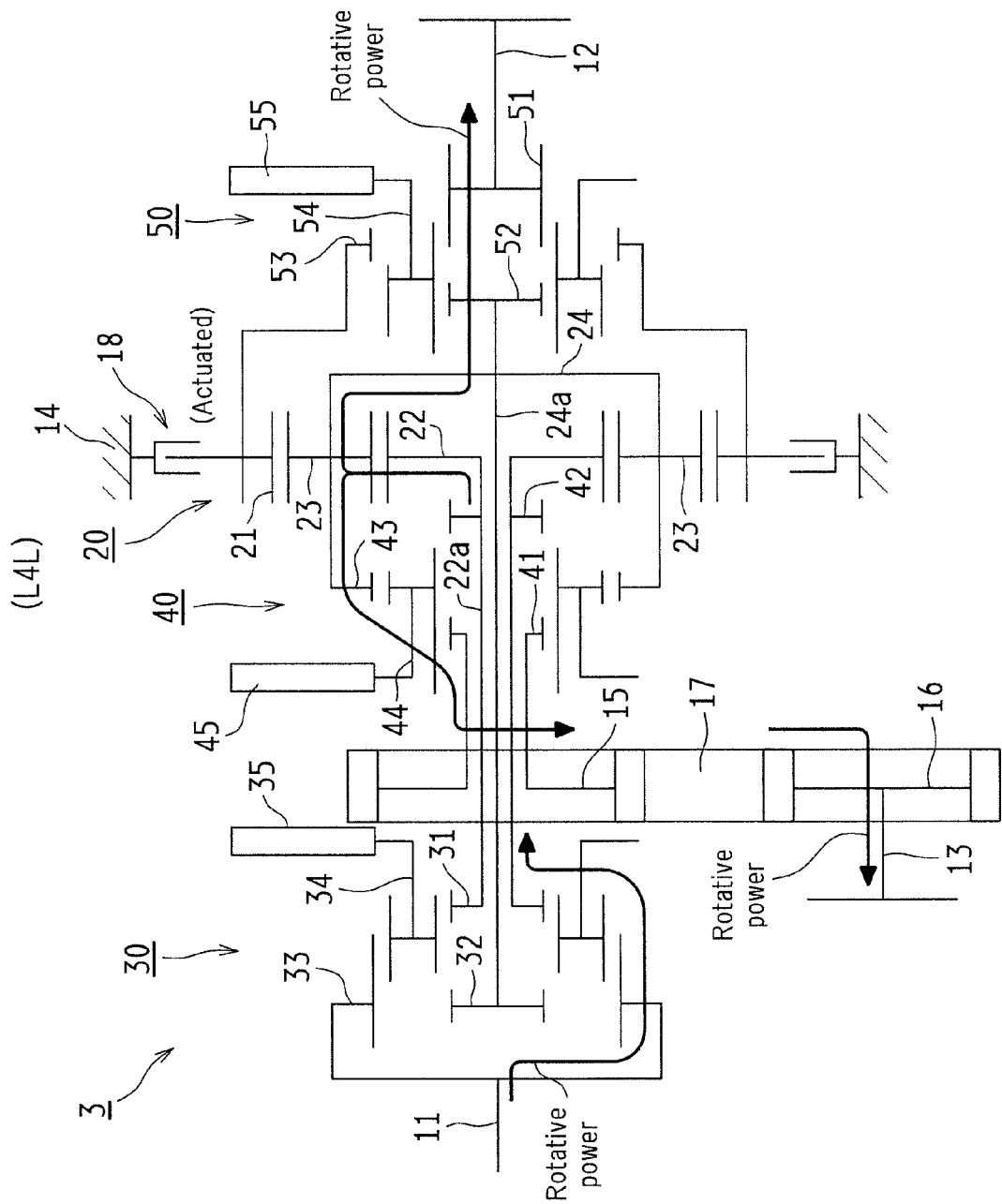
FIG. 5 is a schematic diagram showing an overview of the configuration of the transfer mechanism in FIG. 1, and shows a Lo-4WD-Lock mode.

When the "L4L" mode is selected, the state shown in FIG. 5 is achieved. Specifically, by first actuating the brake 18 so as to put the ring gear 21 into the non-rotatable locked state, and causing the first sleeve 34 of the range switching element 30 to slide to a position of being meshed with the internally-toothed gear 33 of the input shaft 11 and the external teeth of the low gear piece 31, the first sleeve 34 achieves the second coupled state in which the input shaft 11 is coupled with the low gear piece 31 and the sun gear 22. Also, by causing the second sleeve 44 of the mode switching element 40 to slide to a position of being meshed with the externally-toothed gear 41 of the drive gear 15 and the internally-toothed gear 43 of the carrier 24, the second sleeve 44 achieves the second coupled state in which the drive gear 15 and the carrier 24 are coupled. Furthermore, by causing the third sleeve 54 of the differential switching element 50 to slide to a position of being meshed with the externally-toothed gear 51 of the rear-wheel output shaft 12 and the externally-toothed gear 52 of the carrier 24, the third sleeve 54 achieves the second coupled state in which the rear-wheel output shaft 12 and the carrier 24 are coupled.

In this case, as shown by the bold arrow in FIG. 5, rotative power input from the input shaft 11 to the first sleeve 34 and the low gear piece 31 is input to the sun gear 22 of the planetary gear mechanism 20 via the central tube shaft part 22a, is decelerated when being input from the sun gear 22 to the pinion gears 23 and the carrier 24, and thereafter is transmitted to the rear-wheel output shaft 12 via the externally-toothed gear 52 of the carrier 24 and the third sleeve 54, and is transmitted to the front-wheel output shaft 13 via the second sleeve 44 and the power transmission unit (15 to 17). In this state, the pinion gears 23 supported by the carrier 24, the ring gear 21, and the sun gear 22 of the planetary gear mechanism 20 are not capable of relative rotation, and therefore the above-described rotative power is no longer differentially distributed to the rear-wheel output shaft 12 and the front-wheel output shaft 13.

Incidentally, with the configuration of the above-described transfer mechanism 3, it is possible to switch to a drive mode for achieving low-range (low-speed gear range) rear-wheel two-wheel driving. This drive mode is called the "Lo-2WD" mode, which is abbreviated to the "L2" mode.

Although not shown, in order to realize this "L2" mode, first the brake 18 is deactivated so as to put the ring gear 21 into the rotatable free state, and the first sleeve 34 of the range switching element 30 is caused to slide to a position of being meshed with the internally-toothed gear 33 of the input shaft 11 and the external teeth of the low gear piece 31, and thus the first sleeve 34 achieves a state in which the input shaft 11 is coupled with the low gear piece 31 and the sun gear 22. Also, by causing the second sleeve 44 of the mode switching element 40 to slide to a position of being meshed with only the externally-toothed gear 41 of the drive gear 15, a state in which the drive gear 15 can idle is achieved. Furthermore, by causing the third sleeve 54 of the differential switching element 50 to slide to a position of being meshed with the externally-toothed gear 51 of the rear-wheel output shaft 12 and the externally-toothed gear 52 of the carrier 24, the third sleeve 54 achieves a state in which the rear-wheel output shaft 12 and the carrier 24 are coupled. In this case, rotative power input from the input shaft 11 to the first sleeve 34 and the low gear piece 31 is input to the sun gear 22 of the planetary gear mechanism 20 via the central tube shaft part 22a, is decelerated when being input from the sun gear 22 to the pinion gears 23 and the carrier 24, and thereafter is transmitted to the rear-wheel output shaft 12 via the externally-toothed gear 52 of the carrier 24 and the third sleeve 54.

It is also possible to switch to a drive mode for achieving high-range (high-speed gear range) front-wheel two-wheel driving. This drive mode is called the "Hi-FF2WD" mode.

Although not shown, in order to realize this "Hi-FF2WD" mode, first the brake 18 is deactivated so as to put the ring gear 21 into the rotatable free state, and the first sleeve 34 of the range switching element 30 is caused to slide to a position of being meshed with the internally-toothed gear 33 of the input shaft 11 and the external teeth of the high gear piece 32, and thus the first sleeve 34 achieves a state in which the input shaft 11 is coupled with the high gear piece 32 and the carrier 24. Also, by causing the second sleeve 44 of the mode switching element 40 to slide to a position of being meshed with the internally-toothed gear 43 of the carrier 24 and the externally-toothed gear 41 of the drive gear 15, the second sleeve 44 achieves a state in which the carrier 24 and the drive gear 15 are coupled. Furthermore, by causing the third sleeve 54 of the differential switching element 50 to slide to a position of being meshed with the externally-toothed gear 51 of the rear-wheel output shaft 12 and the internally-toothed gear 53 of the ring gear 21, the third sleeve 54 achieves a state in which the rear-wheel output shaft 12 and the ring gear 21 are coupled. In this case, rotative power input from the input shaft 11 to the first sleeve 34 and the high gear piece 32 is input to the carrier 24 of the planetary gear mechanism 20 via the central shaft part 24a, is directly transmitted from the internally-toothed gear 43 of the carrier 24 to the front-wheel output shaft 13 via the second sleeve 44 and the power transmission unit (15 to 17), and rotative power is no longer transmitted to the rear-wheel output shaft 12. Note that the front-wheel output shaft 13 and the rear-wheel output shaft 12 are cut off by the rotation of the pinion gears 23 supported by the carrier 24.

It is also possible to switch to a drive mode for achieving low-range (low-speed gear range) front-wheel two-wheel driving. This drive mode is called the "Lo-FF2WD" mode.

Although not shown, as another mode for realizing this "Lo-FF2WD" mode, first the brake 18 is deactivated so as to put the ring gear 21 into the rotatable free state, and the first sleeve 34 of the range switching element 30 is caused to slide to a position of being meshed with the internally-toothed gear 33 of the input shaft 11 and the external teeth of the low gear piece 31, and thus the first sleeve 34 achieves a state in which the input shaft 11 is coupled with the low gear piece 31 and the sun gear 22. Also, by causing the second sleeve 44 of the mode switching element 40 to slide to a position of being meshed with the externally-toothed gear 42 of the sun gear 22 and the externally-toothed gear 41 of the drive gear 15, the second sleeve 44 achieves a state in which the sun gear 22 and the drive gear 15 are coupled. Furthermore, by causing the third sleeve 54 of the differential switching element 50 to slide to a position of being meshed with the externally-toothed gear 51 of the rear-wheel output shaft 12 and the externally-toothed gear 52 of the carrier 24 or the internally-toothed gear 53 of the ring gear 21, the third sleeve 54 achieves a state in which the rear-wheel output shaft 12 is coupled with the carrier 24 or the ring gear 21. In this case, rotative power input from the input shaft 11 to the first sleeve 34 and the low gear piece 31 is input to the sun gear 22 of the planetary gear mechanism 20 via the central tube shaft part 22a, is directly transmitted from the externally-toothed gear 42 of the sun gear 22 to the front-wheel output shaft 13 via the second sleeve 44 and the power transmission unit (15 to 17), and rotative power is no longer transmitted to the rear-wheel output shaft 12. Note that the front-wheel output shaft 13 and the rear-wheel output shaft 12 are cut off by the rotation of the pinion gears 23 supported by the carrier 24.

As described above, with the transfer mechanism 3 for a four-wheel drive vehicle of the embodiment to which the present invention is applied, one single pinion planetary gear mechanism 20 is used as the power transmission element for realizing gear shift functionality and center differential functionality. This enables achieving a simpler configuration than in the case of using two single pinion planetary gear mechanisms as in PTL 1 and the case of using one Ravigneaux planetary gear mechanism as in PTL 2, thereby enabling contributing to a reduction in the equipment cost and external dimensions of the transfer mechanism 3.

Moreover, with this embodiment, the mode switching element 40 enables the selection of not only a four-wheel drive mode, but also a two-wheel drive mode, and the differential switching element 50 enables switching to a state in which the center differential functionality (i.e., differential effect) is permitted and a state in which it is prohibited, thus improving usability. Furthermore, since the mode switching element 40 and the differential switching element 50 have relatively simple configurations using merely the second and third sleeves (44 and 54) and appropriate gears (41 to 43 and 51 to 53), the present invention has an advantage in terms of suppressing a rise in equipment cost.

Note that the present invention is not limited to the above-described embodiment, and needless to say, various modifications can be made without departing from the gist of the present invention.

For example, although the example of using the transfer mechanism 3 of the present invention in a drive device for a four-wheel drive vehicle that uses only the engine 1 as the drive source is described in the above embodiment, the present invention is not limited to this. The transfer mechanism 3 of the present invention can be used in, for example, a drive device for a hybrid four-wheel drive vehicle that uses an engine and one motor generator as drive sources, a drive device for a hybrid four-wheel drive vehicle that uses an engine and multiple motor generators as drive sources, and a drive device for an electric four-wheel drive vehicle that uses one or multiple motor generators and no engine as drive sources.

INDUSTRIAL APPLICABILITY

The present invention can be favorably used in a transfer mechanism for a four-wheel drive vehicle that includes a power transmission element for realizing gear shift functionality and center differential functionality.

REFERENCE SIGNS LIST 3 transfer mechanism
11 input shaft
12 rear-wheel output shaft
13 front-wheel output shaft
14 transfer case
15 drive gear
16 driven gear
17 loop-shaped member
18 brake (frictional engaging element)
20 planetary gear mechanism
21 ring gear
22 sun gear
23 pinion gear
24 carrier
30 range switching element
31 low gear piece
32 high gear piece
33 internally-toothed gear of input shaft
34 first sleeve
35 first shift fork
40 mode switching element
41 externally-toothed gear of drive gear
42 externally-toothed gear of sun gear
43 internally-toothed gear of carrier
44 second sleeve
45 second shift fork
50 differential switching element
51 externally-toothed gear of rear-wheel output shaft
52 externally-toothed gear of carrier
53 internally-toothed gear of ring gear
54 third sleeve
55 third shift fork
60 shift actuator
100 4WD control computer

The invention claimed is:

1. A transfer mechanism for a four-wheel drive vehicle, comprising a power transmission element for realizing: gear shift functionality for changing the speed of rotation input to an input shaft and causing the resulting rotation to be output from at least one of a rear-wheel output shaft and a front-wheel output shaft; and center differential functionality for permitting a differential effect between the two output shafts,
wherein the power transmission element includes one planetary gear mechanism configured to have a sun gear, a ring gear, and at least one planetary gear that are arranged in a single line in the radial direction and are not moved in the axial direction, and
the power transmission element further includes:
a first sleeve for ensuring one of a first coupled state in which the input shaft is coupled with a carrier of the planetary gear mechanism and a second coupled state in which the input shaft is coupled with the sun gear of the planetary gear mechanism;
a second sleeve for ensuring one of a first coupled state in which the front-wheel output shaft is coupled with the sun gear, a second coupled state in which the front-wheel output shaft is coupled with the carrier, and a state in which the front-wheel output shaft is disconnected from the sun gear and the carrier and can idle;
a third sleeve for ensuring one of a first coupled state in which the rear-wheel output shaft is coupled with the ring gear of the planetary gear mechanism, a second coupled state in which the rear-wheel output shaft is coupled with the carrier, and a third coupled state in which the rear-wheel output shaft is coupled with the ring gear and the carrier; and
a frictional engaging element for putting the ring gear into a rotatable free state or a non-rotatable locked state, and
wherein the power transmission element ensures the first coupled state of the input shaft and the carrier by the first sleeve so as to switch a gear ratio to a high range, and ensures the second coupled state of the input shaft and the sun gear by the first sleeve so as to switch the gear ratio to a low range, and
wherein the power transmission element includes a low gear piece, a high gear piece, an internally-toothed gear provided on an inner edge of the input shaft, and the first sleeve,
the low gear piece is an externally-toothed gear provided on an outer diameter side of a tip of a central tube shaft part, the central tube shaft part being provided so as to extend toward one side of the sun gear of the planetary gear mechanism in the axial direction in a center of the sun gear of the planetary gear mechanism,
the high gear piece is an externally-toothed gear provided on an outer diameter side of a portion of a central shaft part, the central shaft part protruding from an opening at the tip of the central tube shaft part, the central shaft part being provided on an inner diameter side of the central tube shaft part so as to be inserted in a center of the carrier of the planetary gear mechanism so as to be capable of rotating relative to the central tube shaft part, and the high gear piece being arranged in a line with the low gear piece in the axial direction without being in contact therewith, and
wherein the outer circumference of the first sleeve has external teeth that are capable of meshing with the internally-toothed gear of the input shaft, the inner circumference of the first sleeve has internal teeth that are capable of meshing with the external teeth of the low gear piece or the external teeth of the high gear piece, and in the second coupled state of the input shaft and the sun gear by the first sleeve, the first sleeve is caused to slide to a position of meshing with the internally-toothed gear of the input shaft and the external teeth of the low gear piece, whereas in the first coupled state of the input shaft and the carrier by the first sleeve, the first sleeve is caused to slide to a position of meshing with the internally-toothed gear of the input shaft and the external teeth of the high gear piece.

2. The transfer mechanism for the four-wheel drive vehicle according to claim 1, wherein the power transmission ensures the first coupled state or the second coupled state by the second sleeve so as to switch to a four-wheel drive mode in which rotative power input to the input shaft is output from the rear-wheel output shaft and the front-wheel output shaft, and ensures the state in which the front-wheel output shaft is disconnected from the sun gear and the carrier and can idle by the second sleeve, so as to switch to a two-wheel drive mode in which the rotative power input to the input shaft is output from the rear-wheel output shaft.

3. The transfer mechanism for the four-wheel drive vehicle according to claim 1, wherein the power transmission element ensures the first coupled state of the rear-wheel output shaft and the ring gear by the third sleeve so as to switch to a state in which the differential effect between the two output shafts is permitted, and ensures the second coupled state or the third coupled state by the third sleeve so as to switch to a state in which the differential effect between the two output shafts is prohibited.

* * * * *